Sept. 23, 1930.  C. L. KNUTSON  1,776,513
SNAP FASTENER
Filed Dec. 31, 1927   2 Sheets-Sheet 1

Inventor
Carl L. Knutson
By
Rector, Hibben, Davis & Macauley
Attys

Sept. 23, 1930.    C. L. KNUTSON    1,776,513
SNAP FASTENER
Filed Dec. 31, 1927    2 Sheets-Sheet 2
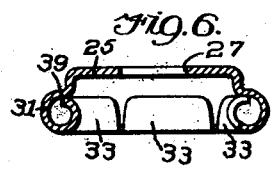
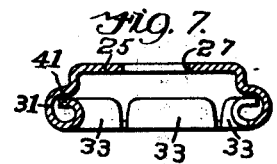
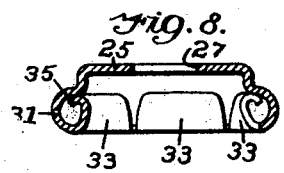
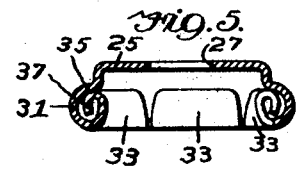
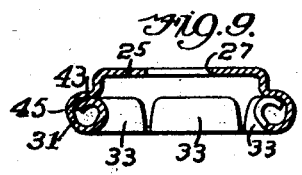
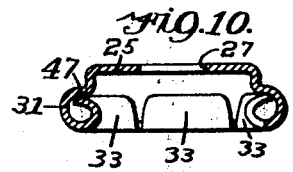
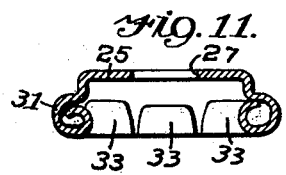
Inventor
Carl L. Knutson
By Rector, Hibben, Davis & Macauley
Attys Patented Sept. 23, 1930

1,776,513

UNITED STATES PATENT OFFICE

CARL L. KNUTSON, OF MAYWOOD, ILLINOIS, ASSIGNOR TO CINCH MANUFACTURING CORPORATION, OF CHICAGO, ILLINOIS, A CORPORATION OF ILLINOIS

SNAP FASTENER

Application filed December 31, 1927. Serial No. 244,023.

This application is a continuation in part of my co-pending application Serial No. 217,093, filed September 2, 1927.

My invention, which relates to snap fasteners and has among its objects the provision of a fastener of durable construction and improved action, will be best understood from the following description when read in the light of the accompanying drawings of several embodiments of the invention, while the scope of the invention will be more particularly pointed out in the appended claims.

In the drawings,

Fig. 1 is also a section on the line 5—5 of Fig. 4;

Fig. 5 is a section on the line 5—5 of Fig. 4;

Figure 4:
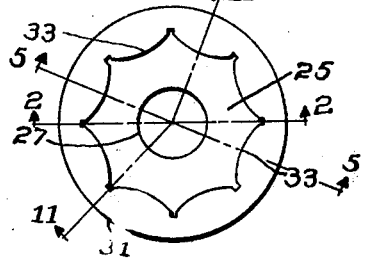
Fig. 4 is an elevation of the socket as viewed from the right of Fig. 3.

Figs. 6 to 10 inclusive each show a modification of the socket constructed according to Figs. 1 to 5, and correspond to sections on the line 5—5 of Fig. 4; and Fig. 11 shows a further modification of the socket, and corresponds to a section on the line 11—11 of Fig. 4.

Referring to Figs. 1 to 5 of the drawings showing the preferred embodiment of the invention, the socket, for convenience of illustration only, is shown as arranged for detachably securing to each other fabric sheets $a$ and $b$, the sheet $a$ having attached thereto the stud 3, which is adapted to be removably inserted into the socket.

As illustrated, the stud comprises the perforated transverse portion 5 having a marginal wall 7 which at its outer edge is reversely turned as at 9 to provide an outer wall 11 which carries a base flange 13. For securing the stud to the fabric sheet, there is provided a tubular rivet the shank 15 of which is inserted through the perforation in the portion 5 of the stud and headed as at 17, said shank extending through a perforation in the fabric sheet and having a flanged head 19 resting against the side of said sheet opposite the base flange 13 so as to clamp said sheet between said portions and securely hold the stud. It should be understood that the same type of stud may be secured to any suitable support in any suitable manner.

As shown, the outer wall 11 of the stud is tapered from the portion 9 to the base flange 13 so as to present a stud having a head 21 and a neck 23.

As shown by Figs. 1 to 5 inclusive the socket has a base 25 perforated at 27 for reception of the shank 29 of a tubular rivet, the latter for securing the socket to the fabric sheet $a$ in a manner similar to that described in connection with the stud.

The socket illustrated by Figs. 1 to 5 has a marginal wall 31 integral with the base 25, said wall being generally channel-shaped in cross-section and concave with respect to the socket axis, and at its edge opposite the base 25 integrally carrying the bases of spring jaws 33 for engaging the stud when the latter is inserted into the socket. These jaws are so constructed and arranged relative to the stud that the neck of the latter is more or less loosely engaged when inserted into the socket, while said jaws are sprung transversely or radially of the socket by the stud head when the latter is inserted or removed relative to the socket.

Figure 1:
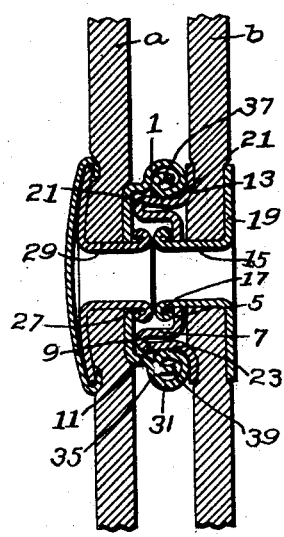
Figure 1 is a longitudinal section on an enlarged scale of a snap fastener constructed according to the invention, the socket and stud of the fastener being shown in engaged relation. With respect to the socket.
Figure 2:
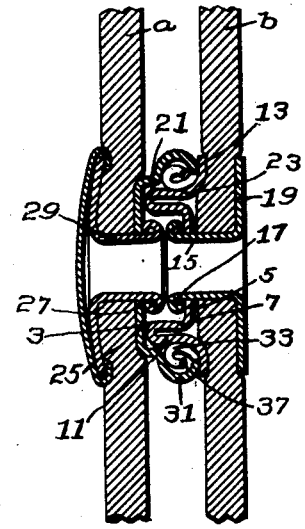
Fig. 2 is a view similar to Fig. 1, except that it corresponds with respect to the socket to a section on the line 2—2 of Fig. 4.
Figure 3:
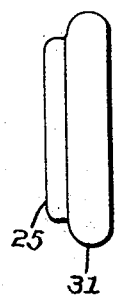
Fig. 3 is a side elevation of the socket of the fastener.

As best shown by Fig. 4, the faces of the jaws 33 considered in planes transverse to the socket axis are convex with respect to said axis. This construction provides that the faces of the jaws will contact with the stud head, when the latter is inserted and removed, only at the portions of said faces midway between the sides thereof, with the result that the head will not spring the jaws radially as far during insertion or removal of the stud as would occur, for example, if the faces of the jaws were concentric with the socket axis as has heretofore been proposed. The present construction therefore permits the jaws to be made of heavier, stiffer material, with the result that the stud is more securely held in the socket and a better spring action and a more durable socket are secured. This construction also results in a tangential contact between each jaw and the head of the stud when the latter is inserted into or removed from the socket, thereby reducing to a minimum the frictional resistance which must be overcome during the insertion and removal as above referred to, the resistance being far less than with the prior construction above referred to, because in the latter construction the edges of the jaws at the opposite sides of the faces thereof bear against the stud during these operations. It will further be observed that by making the jaws convex with respect to the socket axis in planes including said axis, as shown by Figs. 1 and 5, as well as convex with respect to said axis in planes transverse to said axis, as shown by Fig. 4, the jaws and stud during insertion and removal of the latter have substantially point to point contact. The before-mentioned advantages would in some degree be presented by a construction wherein the ends of the jaws combined in planes transverse to the axis of the socket were straight or of concave construction and of such great radius as to bear against the stud at their centre only, but I prefer the convex jaw construction illustrated as being stronger and as providing a somewhat improved action.

In the preferred embodiment of the invention, the jaws, as clearly shown by Figs. 1 and 5, are bent so as to contact at 35 with that portion of the inner surface of the marginal wall 31 of the socket which is generally transverse to the socket axis yet downwardly inclined as viewed in Fig. 5 with respect to the jaws. By this construction, I provide that when the socket head is inserted or removed the resulting transverse or radial movement of the free ends of the jaws relative to the socket will be resisted by their frictional engagement with this portion 35 of the marginal wall 31, causing the jaws to act as compound spring substantially fixed at opposite ends with the load applied between said ends. This gives a stronger spring action than if the jaws flexed only from the end thereof which is joined to the marginal wall.

The construction shown by Fig. 5 also provides, by reason of the contact of the free portions of the jaws with the generally transverse portion 35 of the marginal wall, an effective resistance to crushing stresses on the socket.

As shown by Fig. 5, the jaws have outturned terminal portions 37 so disposed that, when the jaw is sprung to the maximum extent by the stud head during insertion or removal of the stud, said portions will be approximately in contact with the inner surface of the marginal wall. This construction results in the jaw effectively resisting lateral or transverse stresses exerted between the stud and socket which otherwise might stress the jaws beyond their elastic limit in situations where such lateral stresses may occur, as for example when the fastener is used for securing parts of side curtains on automobiles, or for like uses.

In the modifications of the invention shown by Fig. 6, the free end of the jaw contacts with the inner surface of the lateral wall 31 at a portion 39 of said surface which is transverse with respect to the socket axis yet not inclined downwardly as viewed in Fig. 6 sufficiently to resist transverse or radial movement of the jaw when the latter is flexed by insertion or removal of the socket head. In this construction, therefore, although crushing stresses axially of the socket will be effectively resisted, no compound spring action or resistance to lateral stresses between the stud and socket as heretofore described in connection with the modification shown by Fig. 5 will be secured.

In the socket constructed according to Fig. 7, the upper free portions 41 of the jaws are normally out of contact with the lateral wall 31 of the socket. Preferably the jaws in this modification are designed so as to be brought about into contact with the concave inner surface of the lateral wall when the jaws are spread to their maximum extent by the stud head during insertion or removal thereof. This construction results in the jaws resisting lateral or transverse stresses exerted between the stud and socket, but will not secure the compound spring action mentioned in connection with the embodiment of the invention illustrated by Fig. 5, or resist crushing stresses axially of the socket.

The modification shown by Fig. 8 is similar to that shown by Fig. 5, except that the terminal portions 37 of the jaws of the latter are omitted, with the result that the construction shown by Fig. 8 will secure the hereinbefore mentioned compound spring action and resist the crushing stresses axially of the socket without to the same extent as in the former construction resisting lateral stresses exerted between the stud and socket.

According to the modification shown by Fig. 9 the jaw is so formed as to present a portion which contacts with the inner surface of the lateral wall of the socket at 43, said portion of the surface not being inclined downwardly as viewed in Fig. 9 sufficiently to resist lateral movement of the jaw when the stud is inserted or removed, with the result that although this construction will resist crushing stresses on the stud, it will not secure the compound spring action hereinbefore mentioned. The terminal portion 45 of the jaw constructed according to Fig. 9 is so disposed as to about contact with that portion of the inner surface of the lateral wall which is parallel with the socket axis when the jaw is sprung to its maximum extent by the stud head during insertion or removal of the latter, with the result that this construction will effectively resist transverse or lateral stresses exerted between the stud and the socket. It will be observed that the construction shown by Fig. 9 combines in the respects mentioned the functions of the constructions shown by Figs. 6 and 7.

In the modification shown by Fig. 10, the jaws are so constructed that the ends of their terminal portions 47 contact with that portion of the inner surface of the lateral wall 31 which is about normal to the line of movement of the end of said terminal portion when the head of the stud, during insertion or removal, tends to flex said jaws, with the result that this construction will secure the hereinbefore mentioned compound spring action and resist lateral stresses exerted between the stud and socket while to some extent resisting crushing stresses on the socket.

In the modification shown by Fig. 11 alternate jaws are constructed as shown by Figs. 6 and 7 respectively, the left hand jaw as viewed in said figure being constructed according to Fig. 7, and the right-hand jaw according to Fig. 6, with the result that with the construction shown by Fig. 6 both crushing stresses axially of the socket and transverse or lateral stresses exerted between the stud and socket are effectively resisted.

Although the construction shown by Figs. 1 to 5 constitutes the preferred embodiment of the invention, it will be understood that sockets constructed according to the several modifications shown by the other figures, which modifications present simpler constructions, may be employed where conditions of use warrant them.

I have described and illustrated several forms of my invention, but I do not wish to limit the scope of my invention thereby, and therefore reference is made to the following claims as more adequately covering the scope of my invention.

I claim:

1. A snap fastener socket having, in combination, a continuous lateral wall carrying at the outer edge thereof a plurality of stud-retaining jaws which are surrounded by said wall, a socket part in rigid relation to said wall presenting a surface which is generally transverse relative to the socket axis, said jaws having free end portions normally substantially in contact with said surface.

2. A snap fastener socket having, in combination, a continuous unbroken lateral wall of generally channel-shaped cross-section with the open side of said channel facing the socket axis, spring jaws for engaging a snap fastener stud, said jaws being surrounded by said wall, said jaws at one end thereof carried at one edge of said wall and extending toward the other edge of said wall into substantial contact with said wall adjacent the last mentioned edge thereof.

3. A snap fastener socket having, in combination, means presenting an annular lateral wall integrally carrying at one edge thereof a plurality of spring jaws for engaging a snap fastener stud, the portions of said wall adjacent the other edge thereof being bent toward the socket axis, said jaws being surrounded by said wall and being curved normally substantially to contact with said portions of said wall bent toward the socket axis.

4. A snap fastener socket having, in combination, means forming a rigid lateral wall integrally carrying at one edge thereof a plurality of spring jaws for engaging a snap fastener stud, the portions of said wall adjacent the other edge thereof being bent toward the socket axis, said jaws being surrounded by said wall and having their free ends terminating at said portions of said wall bent toward the socket axis substantially in contact therewith.

5. A snap fastener socket having, in combination, a base, a rigid part formed integrally with said base and presenting a lateral interior surface, and spring jaws for engaging a snap fastener stud, said jaws carried by said rigid part and having portions in close proximity to said surface for cooperation therewith for resisting transverse stresses exerted between the stud and socket.

6. A snap fastener socket having, in combination, a base operatively carrying a rigid part presenting a lateral interior surface, and spring jaws integral with said part for engaging a snap fastener stud, said jaws having portions directed toward said surface to provide portions in close proximity to the latter for contacting therewith when subjected to deflection in excess of that caused by insertion or removal of said stud.

7. A snap fastener socket having, in combination, a base, a lateral wall integral with said base, spring jaws carried by the outer portions of said wall for engaging a snap fastener stud, said jaws being convex with respect to the socket axis and formed with terminal portions directed toward the plane of the socket opening, said terminal portions of said jaws being in close proximity to the intermediate portion of the inner surface of said wall for cooperation therewith for resisting lateral stresses between said stud and socket.

8. A snap fastener socket having, in combination, a rigid part, and a plurality of spring jaws for engaging a snap fastener stud, said part formed with generally transverse and lateral interior surfaces, said jaws being formed to present parts in close proximity to said surfaces for cooperation therewith to resist crushing stresses axially of said socket and transverse stresses between said socket and said stud.

9. A snap fastener socket having, in combination, a base operatively carrying a rigid lateral wall which is concave with respect to the socket axis, spring jaws which are convex with respect to said axis for engaging a snap fastener stud, said jaws carried at the outer portions of said wall and bent to form portions in proximity with both the inner relatively transverse portions of said wall and the relatively longitudinally disposed intermediate portions thereof for cooperation with both of said portions of said wall to resist crushing stresses axially of said socket and transverse stresses between said socket and said stud.

10. A snap fastener socket having, in combination, a rigid part providing generally transverse and lateral interior surfaces, the outer portions of said part operatively carrying spring jaws for engaging a snap fastener stud; said jaws being generally convex with respect to the socket axis, and having terminal portions directed toward the socket opening in close proximity to said lateral surfaces for cooperating therewith to resist transverse stresses between said stud and socket, and having other portions in substantial contact with said transverse surfaces and cooperating therewith for resisting crushing stresses axially of said socket.

11. A snap fastener socket having, in combination, a rigid part carrying a plurality of spring jaws for engaging a snap fastener stud, said part formed with generally transverse and lateral surfaces, at least some of said jaws formed with portions for contacting with said transverse surfaces to resist crushing stresses axially of said stud, and at least some of said jaws formed with portions in proximity to said lateral surfaces for cooperation therewith to resist transverse stresses between said socket and said stud.

12. A snap fastener socket having, in combination, a wall of generally channel-shaped cross-section with the open side of said channel facing the socket axis, spring jaws for engaging a snap fastener stud, said jaws being surrounded by said wall, said jaws at one end thereof carried at one edge of said wall and extending toward the other edge of said wall and being normally in frictional engagement with the portions of said wall adjacent the last mentioned edge thereof.

13. A snap fastener socket having, in combination, a portion formed to present an interior surface generally transverse to the socket axis but, in planes including the socket axis, slightly inclined toward the socket opening, a plurality of spring jaws for detachably engaging a snap fastener stud, said jaws at one of the ends thereof being operatively held in fixed relation relative to said interior surface and being formed with portions remote from said ends contacting with said surface throughout the extent of movement of said jaws when flexed by removal and insertion of said stud.

14. A snap fastener socket having, in combination, a rigid lateral annular wall which is concave with respect to the axis of said socket, in planes including said axes the outer edge of said wall integrally carrying a plurality of spring jaws in said plane for engaging a snap fastener stud, said jaws being convex with respect to said axis and frictionally contacting said wall adjacent the inner edge of the latter at a portion thereof which is outwardly curved toward the socket opening.

15. A snap fastener socket having, in combination, a means forming a rigid lateral wall integrally carrying at one edge thereof a plurality of spring jaws for engaging a snap fastener stud, the portions of said wall adjacent the other edge thereof being bent toward the socket axis, said jaws being surrounded by said wall and having their free end portions in frictional contact with said portions of said wall bent toward said socket axis.

16. A snap fastener socket having, in combination, a rigid part, spring jaws for engaging a snap fastener stud, said rigid part and jaws being so relatively formed as to cause said jaws frictionally to engage with said rigid part when said stud is inserted or removed, and to cause said rigid part to act as a stop for said jaws when the socket is subjected to crushing stresses axially thereof and when the fastener is subjected to transverse stresses between the stud and socket.

17. A snap fastener socket having, in combination, means forming a rigid part presenting generally transverse and lateral surfaces, spring jaws for engaging a snap fastener stud, said jaws being generally convex with respect to the socket axis in planes including said axis and having inner portions frictionally contacting with said transverse surfaces when the stud is inserted or removed, and having terminal portions cooperating with said lateral surfaces for resisting transverse stresses on said stud.

18. A snap fastener socket having, in combination, means forming a rigid part presenting generally transverse and lateral surfaces, spring jaws for engaging a snap fastener stud, said jaws being generally convex with respect to the socket axis in planes including said axis and having inner portions frictionally contacting with said transverse surfaces when the stud is inserted or removed, and having terminal portions presenting lateral surfaces cooperating with said first mentioned lateral surfaces for resisting transverse stresses on said stud.

19. A snap fastener socket having, in combination, a lateral wall which is generally concave with respect to the socket axis in planes including said axis, spring jaws carried by the outer portions of said wall, said jaws having portions in said planes for cooperation with a snap fastener stud, which portions in said planes are generally convex with respect to said axis and, at the inner free ends thereof, frictionally contact with the base portions of said wall, said jaws also having reversely turned terminal portions in proximity with the intermediate portions of said wall.

20. A snap fastener socket having the lateral wall 31, jaws integrally formed from said wall; said jaws having the portions 33 for engagement with a snap fastener stud, the portions 35 for frictional engagement with said wall, and the terminal portions 37 cooperating with said wall for resisting lateral stresses on an inserted snap fastener stud.

21. A snap fastener socket having, in combination, sheet metal formed to provide a body with a lateral wall surrounding the socket axis, spring jaws integrally carried by an edge portion of said wall, said jaws being surrounded by said wall and being convex with respect to said socket axis in planes including said axis and intermediate their lengths having stud-head-engaging portions which are convex with respect to said axis in planes transverse to said axis; said lateral wall of said socket, at portions thereof which are spaced from said edge portion thereof, having portions directed toward the socket axis at a slight inclination away from said edge, said jaws having portions normally in contact with said last mentioned portions of said wall.

22. A snap fastener socket having, in combination, sheet metal formed to provide a body with a lateral wall surrounding the socket axis, spring jaws integrally carried by an edge portion of said wall, said jaws being surrounded by said wall and being convex with respect to said socket axis in planes including said axis and intermediate their lengths having stud-head-engaging portions which are convex with respect to said axis in planes transverse to said axis; said lateral wall of said socket, at portions thereof which are spaced from said edge portion thereof, having portions directed toward the socket axis at a slight inclination away from said edge, said jaws having portions normally in contact with said last mentioned portions of said wall, said jaws also having terminal portions between said stud-head-engaging portions thereof and said lateral wall in close proximity to the latter.

23. In a curtain fastener of the class described, a cup in which the head of a male member is received, comprising spring retainers formed integral therewith and rolled within the cup and means within the cup on which said retainers bear adjacent the ends of the latter to support them against axial pressure.

24. In a curtain fastener of the class described, a cup in which a male member is received, struck up from a single piece of sheet metal and comprising a bottom, a flange and spring retainers rolled within the cup, the cup having a shoulder on which said retainers bear which shoulder supports them against axial pressure.

25. In a fastener of the class described, a cup in which the male member is received; said cup being struck up from a single piece of sheet metal and comprising a bottom, a flange extending rearwardly from said bottom, and a hollow bead, the metal of the bead adjacent the flange being generally perpendicular to the latter; and separated retaining fingers extending from the inner rear edge of the bead and engaging said portion of the bead adjacent the flange.

In testimony whereof, I have subscribed my name.

CARL L. KNUTSON.

CERTIFICATE OF CORRECTION.

Patent No. 1,776,513.            Granted September 23, 1930, to

CARL L. KNUTSON.

It is hereby certified that error appears in the printed specification of the above numbered patent requiring correction as follows: Page 4, line 76, claim 14, beginning with the word "socket" strike out all to and including the word "jaws" line 79, insert instead socket in planes including said axis, the outer edge of said wall integrally carrying a plurality of spring jaws for engaging a snap fastener stud, said jaws in said planes; and that the said Letters Patent should be read with this correction therein that the same may conform to the record of the case in the Patent Office.

Signed and sealed this 28th day of October, A. D. 1930.

(Seal)                                                 M. J. Moore,
Acting Commissioner of Patents.